United States Patent
Flippo et al.

(10) Patent No.: US 6,551,381 B2
(45) Date of Patent: Apr. 22, 2003

(54) METHOD FOR CARBON MONOXIDE REDUCTION DURING THERMAL/WET ABATEMENT OF ORGANIC COMPOUNDS

(75) Inventors: Belynda G. Flippo, Soquel, CA (US); Robbert Vermuellen, Pleasant Hill, CA (US); Daniel O. Clark, Pleasanton, CA (US)

(73) Assignee: Advanced Technology Materials, Inc., Danbury, CT (US)

( * ) Notice: Subject to any disclaimer, the term of this patent is extended or adjusted under 35 U.S.C. 154(b) by 0 days.

(21) Appl. No.: 09/911,315

(22) Filed: Jul. 23, 2001

(65) Prior Publication Data

US 2003/0024389 A1 Feb. 6, 2003

(51) Int. Cl.$^7$ .......................... B01D 50/00; B01D 47/00
(52) U.S. Cl. .................. 95/54; 95/92; 95/130; 95/149; 96/4; 96/108; 96/243; 96/267; 422/168; 422/182
(58) Field of Search .............................. 95/54, 138, 130, 95/92, 149; 96/4, 108, 143, 134, 243, 267, 355; 422/168, 171, 172, 173, 176, 177, 182, 183

(56) References Cited

U.S. PATENT DOCUMENTS

| | | | |
|---|---|---|---|
| 5,114,683 A | * | 5/1992 | Hirase |
| 5,280,664 A | | 1/1994 | Lin |
| 5,453,494 A | | 9/1995 | Kirlin et al. |
| 5,759,498 A | * | 6/1998 | Sheu et al. |
| 5,832,843 A | * | 11/1998 | Park et al. |
| 5,840,897 A | | 11/1998 | Kirlin et al. |
| 5,855,648 A | * | 1/1999 | Prasad et al. |
| 5,855,822 A | * | 1/1999 | Chen |
| 5,891,404 A | * | 4/1999 | Ibaraki et al. |
| 5,972,078 A | * | 10/1999 | Collins et al. |
| 6,010,576 A | * | 1/2000 | Lin |
| 6,059,858 A | * | 5/2000 | Lin et al. |
| 6,090,183 A | * | 7/2000 | Awaji |
| 6,110,529 A | | 8/2000 | Gardiner et al. |
| 6,119,299 A | * | 9/2000 | Lin |
| 6,153,150 A | * | 11/2000 | Moore et al. |
| 6,187,080 B1 | * | 2/2001 | Ping-Chung et al. |
| 6,217,640 B1 | * | 4/2001 | Lu et al. |
| 6,261,524 B1 | * | 7/2001 | Herman et al. |
| 6,361,584 B1 | * | 3/2002 | Stevens et al. |
| 2001/0032543 A1 | * | 10/2001 | Seeley et al. |
| 2001/0055555 A1 | * | 12/2001 | Herman et al. |

FOREIGN PATENT DOCUMENTS

EP 0933120 * 9/1999

OTHER PUBLICATIONS

U.S. patent application Ser. No. 09/525,221, Inori, filed Mar. 14, 2000.

* cited by examiner

Primary Examiner—Duane S. Smith
(74) Attorney, Agent, or Firm—Marianne Fuierer; William F. Ryann

(57) ABSTRACT

A method and system for retrofitting an integrated scrubber to provide maximum oxygen content in a controlled decomposition oxidation (CDO) abatement process. The system includes a thermal/wet integrated scrubber, and a compressed air supply for supplying air to an oxygen separation device that separates the air into a nitrogen-enriched component and an oxygen-enriched component. The oxygen separation device utilizes a ceramic oxide or polymeric material to separate from the supplied air an oxygen-enriched component for introduction into the integrated scrubber. The integrated scrubber is equipped with a mechanical scraping device for continuous or intermittent removal of combustion deposits formed during the controlled decomposition oxidation process.

27 Claims, 6 Drawing Sheets

METHOD FOR CARBON MONOXIDE REDUCTION DURING THERMAL/WET ABATEMENT OF ORGANIC COMPOUNDS

BACKGROUND OF THE INVENTION

1. Field of the Invention

The present invention relates to the field of thermal/wet abatement of gaseous waste streams, and more particularly to a method and system for retrofitting integrated scrubbers to provide maximum oxygen content in a controlled decomposition oxidation abatement process.

2. Description of the Related Art

Semiconductor manufacturing processes utilize a variety of chemicals, many of which have extremely low human tolerance levels. Such materials include gaseous hydrides of antimony, arsenic, boron, germanium, nitrogen, phosphorous, silicon, selenium; silane; silane mixtures with phosphine, argon, hydrogen; organosilanes, halosilanes and other organic compounds. A significant problem has been the removal of these materials from effluent gas streams of semiconductor manufacturing processes. While virtually all U.S. semiconductor manufacturing facilities utilize scrubbers or similar means for treatment of their effluent gases, the technology employed in these facilities is not capable of removing all toxic or otherwise unacceptable impurities.

One solution to this problem is to incinerate the process gas to oxidize the toxic materials, converting them to less toxic forms. Conventional incinerators, however, typically achieve less than complete combustion thereby allowing the release of pollutants to the atmosphere including carbon monoxide (CO) and hydrocarbons (HC). The problem is compounded when the process stream to be treated is composed primarily of a nonflammable gas bearing the undesirable impurities.

A further limitation of conventional incinerators is their inability to mix sufficient combustible fuel with a nonflammable process stream in order to render the resultant mixture flammable and completely combustible. The choice of fuel gas for mixing with a nonflammable process gas is also important from the perspective of maintaining low operating costs, and the incinerator design must reflect this choice of fuel if proper burning characteristics are to be achieved.

However, many incinerators or combustion chambers currently used in existing facilities, depending on their age and construction, are not equipped with adequate piping systems for providing an additional source of flammable fuel gas, such as oxygen or oxygen enriched air. In such situations, several options are available. Retrofitting the existing combustion chamber with additional piping to provide a controlled incineration is one such option, but the cost of this retrofitting may be prohibitive. As another option, a combustible gas may be premixed with the gaseous effluent from the semiconductor process. However, certain exhaust gases from semiconductor processes, such as a silane containing gases tend to ignite spontaneously upon contact with air and this premixing can introduce a hazard potential.

Oxygen or oxygen enriched air may be added directly into the combustion chamber for mixing with the gaseous waste streams containing silane products, however, oxides, particularly silicon oxides are formed and deposited within the combustion chamber and these oxides tend to clog internal nozzles and deposit on the walls. The mass of silicon oxides formed can be relatively large and the gradual deposition with the combustion chamber can necessitate increase maintenance of the equipment.

Accordingly, it would be advantageous to provide an improved method and system to retrofit an existing thermal reactor unit for introduction of a low cost flammable gas, which retrofit is not cost-prohibitive to install on an existing unit, which reduces the release of pollutants to the atmosphere including carbon monoxide (CO), and which deals with the problems of increased deposition of silicon oxides, if formed.

SUMMARY OF THE INVENTION

The present invention relates to a method and system for providing controlled combustion of gaseous semiconductor wastes, whereby oxygen and/or an enriched oxygen air stream is introduced into a thermal/wet integrated abatement system to facilitate the conversion of nonflammable mixtures to flammable mixtures and decrease CO emissions without a cost-prohibitive retrofit of the thermal/wet integrated abatement system.

In one aspect, the invention relates to a combustion chamber having increased ability to oxidize virtually all oxidizable components in a gaseous waste stream while effectively and efficiently removing combustion product deposits from the inner wall of the combustion chamber.

Another aspect relates to improved abatement capabilities of a combustion chamber by utilizing existing ducting and adapting same to introduce oxygen or oxygen enriched air for controlled decomposition oxidation of a gaseous waste stream.

Yet another aspect relates to a system and method for incinerating a waste stream of gaseous organic compounds wherein the exhaust gas has reduced amounts of carbon monoxide, and hydrocarbons therein.

Still another aspects relates to a method of reducing carbon monoxide and hydrocarbon emissions from a combustion chamber during the abatement of waste gaseous products which is relatively inexpensive and simple to install and operate.

Thus, in accordance with one aspect of the present invention, there is provided a system for abating gaseous waste material, comprising:

a combustion chamber comprising a chamber cleaning means and at least one gas inlet communicatively connected to a source of compressed air; and an oxygen separation unit positioned between the gas inlet and source of compressed air.

Another embodiment of the present invention is directed to a thermal reactor for oxidative treatment of gaseous pollutants in a gas stream, the thermal reactor comprising:

a combustion chamber having an entry end comprising at least one inlet for introducing combustible gaseous products and an exit end for removal of combustion products from the combustion chamber;

a hot zone within the combustion chamber located adjacent to said entry end wherein gases entering the combustion chamber react and mix;

an orifice in the combustion chamber communicatively connected to a source of compressed dry air to introduce air into the combustion chamber, the orifice located downstream of the hot zone; and an oxygen separation unit positioned between the orifice and the source of compressed dry air to provide oxygen and/or oxygen enriched air to the combustion chamber.

The thermal reactor further comprises heating elements that are preferably located annularly about the inner wall of the combustion chamber. The gases exiting the combustion chamber are passed through a liquid vortex that cools the exiting gases, which then are passed through a packed bed for trapping and condensing particles. A liquid scrubber also is provided for removing chemical pollutants. The scrubber may, for example, comprise at least two vertically separated beds containing coated packing.

Preferably, a mechanical scraping means is disposed within the combustion chamber positioned to clean interior surfaces of the combustion chamber to remove buildup of combustion products formed in the combustion chamber. The scraping means comprises a blade apparatus comprising (i) at least one annular mounting member and (ii) at least three scraping blades attached peripherally about the annular mounting member and arranged in a parallel relationship to a longitudinal axis of the chamber; and a reciprocal movement unit for rotating the scraping blade(s) circumferentially back and forth along the interior surface of the chamber to clean the interior surface of the chamber, wherein such reciprocable movement unit comprises a reciprocable member pivotally connected to an extension member, and the extension member is pivotally connected at a peripheral position to the blade apparatus.

The mechanical scraping means and the liquid vortex unit are suitably combined into a unitary assembly.

In one aspect, the liquid vortex comprises a baffle that may be arranged to provide a flow restriction so that during some operations of cleaning the interior of the combustion chamber may be filled with liquid, preferably water, to enhance removal of scraped products from the chamber.

A compressor is communicatively connected to the orifice which is centrally positioned within the combustion chamber of the thermal reactor to supply a source of compressed air to the oxygen separation device positioned downstream of the compressor and upstream of the thermal reactor. The compressor is used to assist in pressurizing the air flow being delivered to the oxygen separation unit, or in a subatmospheric oxygen enrichment system, utilized to increase the pressure of the oxygen-enriched stream at a location downstream of the oxygen separation unit.

The oxygen separation unit of the present invention may comprise any device with selectivity for separating one major gaseous component from the other major components in the feed gas mixture. For example, a single membrane device or alternatively a several membrane device may be provided and operated to achieve a separation of the gaseous components in air. Typically, the membrane devices are manufactured in modules, each having certain semipermeable membrane areas for permeation. Semi-permeable membrane materials currently available which can be employed in this process include: polysulfone, cellulose acetate, polyimide, polyamide, silicone rubber, polyphenylene oxide, ceramic materials, etc.

Preferably, a ceramic material having a high selectivity for oxygen is utilized in the oxygen separation device to efficiently sorptively remove oxygen from an oxygen-containing feed gas mixture, to produce extremely high product gas purity. The ceramic material may be used as a filler material in a separation module or as a coated substrate, e.g., at least a portion of a membrane or fiber surface is coated with the oxygen-adsorbent ceramic material.

The ceramic material may comprise at least one material such as:
- oxide fluorite oxygen ion conductors of the formula $A_4O_8$;
- pyrochlore material of the formula $A_2B_2O_7$;
- material of the formula $Bi_2O_3(A_2O_6)$;
- stabilized forms of $d\text{-}Bi_2O_3$;
- $Bi_{24}Pb_5Ca_3O_{44}$;
- $Bi_{14}V_2O_{11}$;
- perovskite materials of the formula $ABO_3$;
- oxide Brown Millerite electrolytes of the formula $A_2B_2O_5$;
- mixed Brown Millerite electrolytes of the formula $ABO_3ABO_{2.5}$;
- $A_4O_6ABO_{2.5}$ compositions;
- mixed superconducting ($ABO_3AO$) electrolytes;
- cryolite ($A_3BO_3$) electrolytes;
- columbite ($AB_2O_6$) electrolytes;
- and corresponding doped materials, wherein A and B are metals independently selected from the group consisting of lanthanum, aluminum, strontium, titanium, calcium, zirconium, iron, barium, indium, gadolinium, yttrium, copper, cerium, thorium, bismuth, cobalt, nickel, magnesium, manganese, vanadium, chromium, niobium, tantalum, boron, haffiium, neodymium, terbium, ytterbium, erbium, thullium, lutetium, samarium, lead, tin, lawrencium, and praseodymium.

A further aspect of the invention relates to a method of forming ceramic-coated fiber, wherein the ceramic is a metal oxide ceramic including at least one metal having a "high adsorptive capacity" at elevated temperatures, in which the method comprises the steps of:
(a) reacting nitric acid and ethylene glycol to yield glycolic acid;
(b) heating the glycolic acid to form oxalate ion;
(c) reacting the oxalate ion with the at least one metal to form a sol gel comprising corresponding metal oxalate (s);
(d) depositing the sol gel on a fiber substrate; and
(e) calcining the sol gel on the fiber substrate to form a corresponding ceramic coating and yield the ceramic-coated fiber.

As used herein, the term "high adsorptive capacity" means an oxygen storage capacity of at least 40 millimoles of oxygen per mole of the ceramic material when the ceramic material is contacted with oxygen gas at a temperature of 800° C.

As used herein, the term "elevated temperature" means a temperature in the range of from 500° C. to 1000°C.

When metal oxide ceramics are referred to herein in symbolic notational form without stoichiometric subscripts (e.g., in the term LaCaCoMO), it is to be understood that the respective elemental constituents are present in such material in stoichiometrically appropriate proportions relative to one another.

In another aspect, the invention relates to a method for generating oxygen-enriched air for subsequent introduction into an integrated scrubber system that comprises a combustion chamber for abatement of gaseous waste products from a semiconductor process. The method includes the steps of:
providing an oxygen and nitrogen separation system to effect separation of air into at least a nitrogen gas component and an oxygen gas component;
introducing compressed air into an inlet of the oxygen and nitrogen separation system;
withdrawing the nitrogen component from the oxygen and nitrogen separation system;
withdrawing the oxygen component from the oxygen and nitrogen separation system; and
introducing the oxygen component into the combustion chamber for mixing with the gaseous waste products for abatement therein.

Yet another aspect of the present invention relates to a method for retrofitting an abatement system for processing a gaseous waste stream to introduce an oxygen or nitrogen enriched source therein, the method comprising:

provide an oxygen and/or nitrogen enriching device communicatively connected to an abatement chamber;

introducing compressed dry air to the oxygen and/or nitrogen enriching device wherein the compressed dry air is separated into an oxygen rich gaseous component and a nitrogen rich gaseous component; and directing and introducing the oxygen or nitrogen enriched gaseous component to the abatement chamber.

The method of retrofitting may further comprise:

providing a mechanical scraping device to remove combustion products deposited during the processing of the gaseous waste stream wherein the mechanical scraping device comprises:

(i) at least one annular mounting member;

(ii) at least three scraping blades attached peripherally about the annular mounting member and arranged in a parallel relationship to a longitudinal axis of the chamber; and (iii) a reciprocal movement unit for rotating the scraping blade(s) circumferentially back and forth along the interior surface of the chamber to clean the interior surface of the chamber, wherein such reciprocable movement unit comprises a reciprocable member pivotally connected to an extension member, and the extension member is pivotally connected at a peripheral position to the blade apparatus.

Other aspects, features and embodiments of the invention will be more fully apparent from the ensuing disclosure and appended claims.

DETAILED DESCRIPTION OF THE PREFERRED EMBODIMENT

Figure 1:
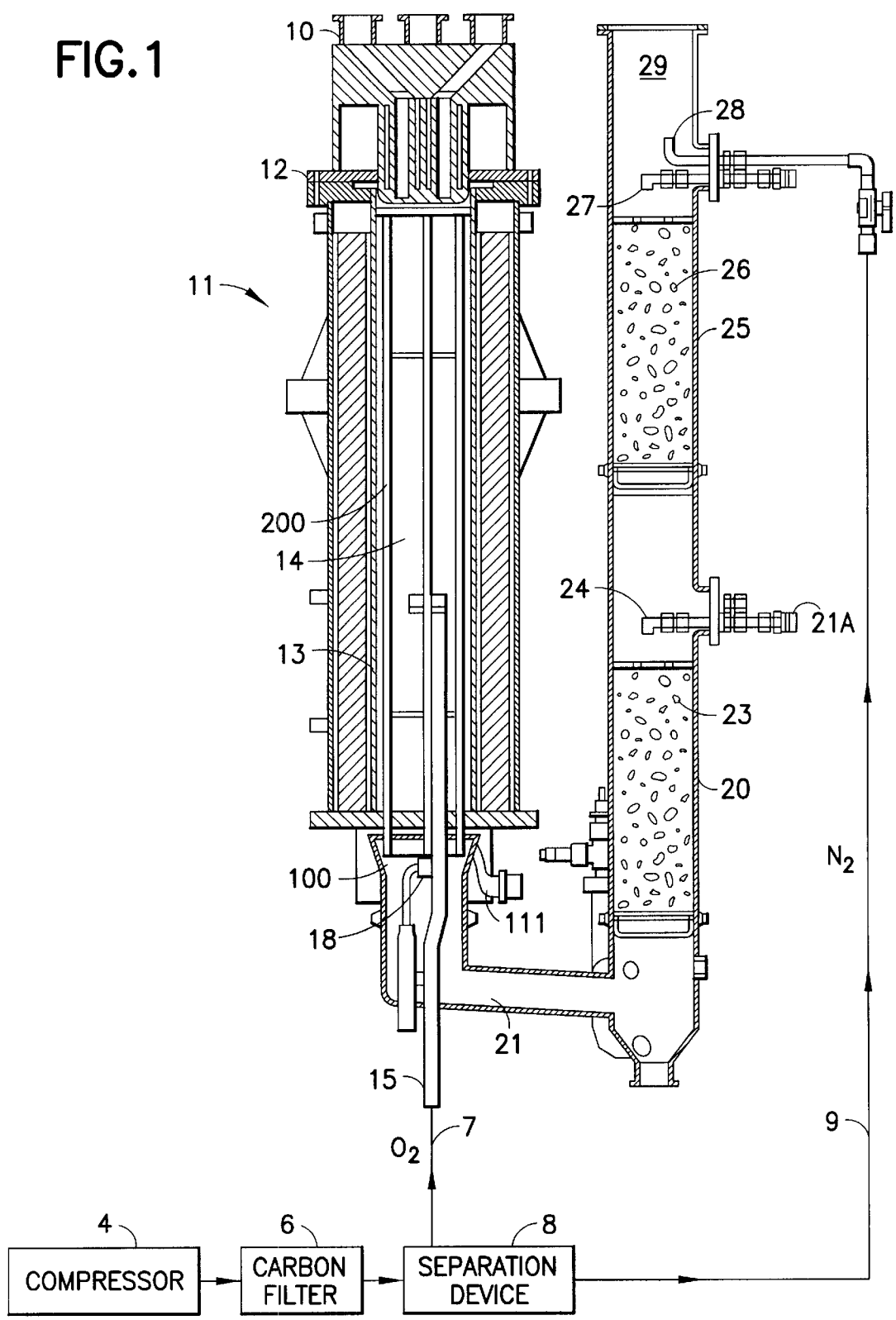
FIG. 1 is a schematic representation diagram of a retrofitted abatement system for controlled decomposition oxidation of a gaseous waste stream according to one embodiment of the invention.

Referring now to FIG. 1, the present invention provides a method and system for generating oxygen-enriched air for use in an abatement system for destroying gaseous waste products, comprising a thermal/wet integrated scrubber 11; and a compressed air supply 4 for supplying compressed air to an oxygen separation unit 8 that separates air into a nitrogen gas-enriched component and an oxygen gas-enriched component.

The thermal/wet scrubbing integrated system 11 is shown, in diagram form, as a waste gas processing system wherein a waste gas from one or more semiconductor processing stations enters inlets 10, and is mixed with, if required, other gases. Typically, gas flow rates through such a waste processing system are less than about 300 standard liters per minute (slpm).

The waste gases are then treated in the thermal reactor or combustion chamber 14, to which air is optionally introduced through lines 12 and/or 15. The gases exiting the bottom of the thermal reactor 14 pass through a liquid vortex 100 of liquid flowing through inlet line 111. The gases from the thermal reactor exit are passed through a water spray 18 and then through conduit 21 into the packed liquid scrubber 20.

Liquid scrubber 20 contains packing 23 through which the gases are flowed in counter-current and/or optionally co-current manner with and/or against the flow of water provided by continuous sprayer 24. Particle-containing liquid flows to the bottom to a sump tank, and/or recirculation tank, and/or direct drain.

The gas is typically directed via ports 21A to a demister section 25 where moisture and additional particulate are removed via demister packing 26 and the cleaning of this section is accomplished with liquid provided by a continuous and/or intermittent sprayer 27. Air is injected through port 28 to provide direct cooling and promote reduction of the humidity of the exiting gas. The treated gas then exits through flue 29.

In the interior of the combustion chamber 14 a mechanical scraping device 200 is positioned downstream of the entry inlet 10 and cleans the interior chamber walls 13 for removal of combustion products deposited during the combustion process. The mechanical scraping device may be constructed and arranged as described in co-pending U.S. patent application Ser. No. 09/525,221, filed on Mar. 14, 2000, the disclosure of which hereby is incorporated herein by reference in its entirety.

Figure 2:
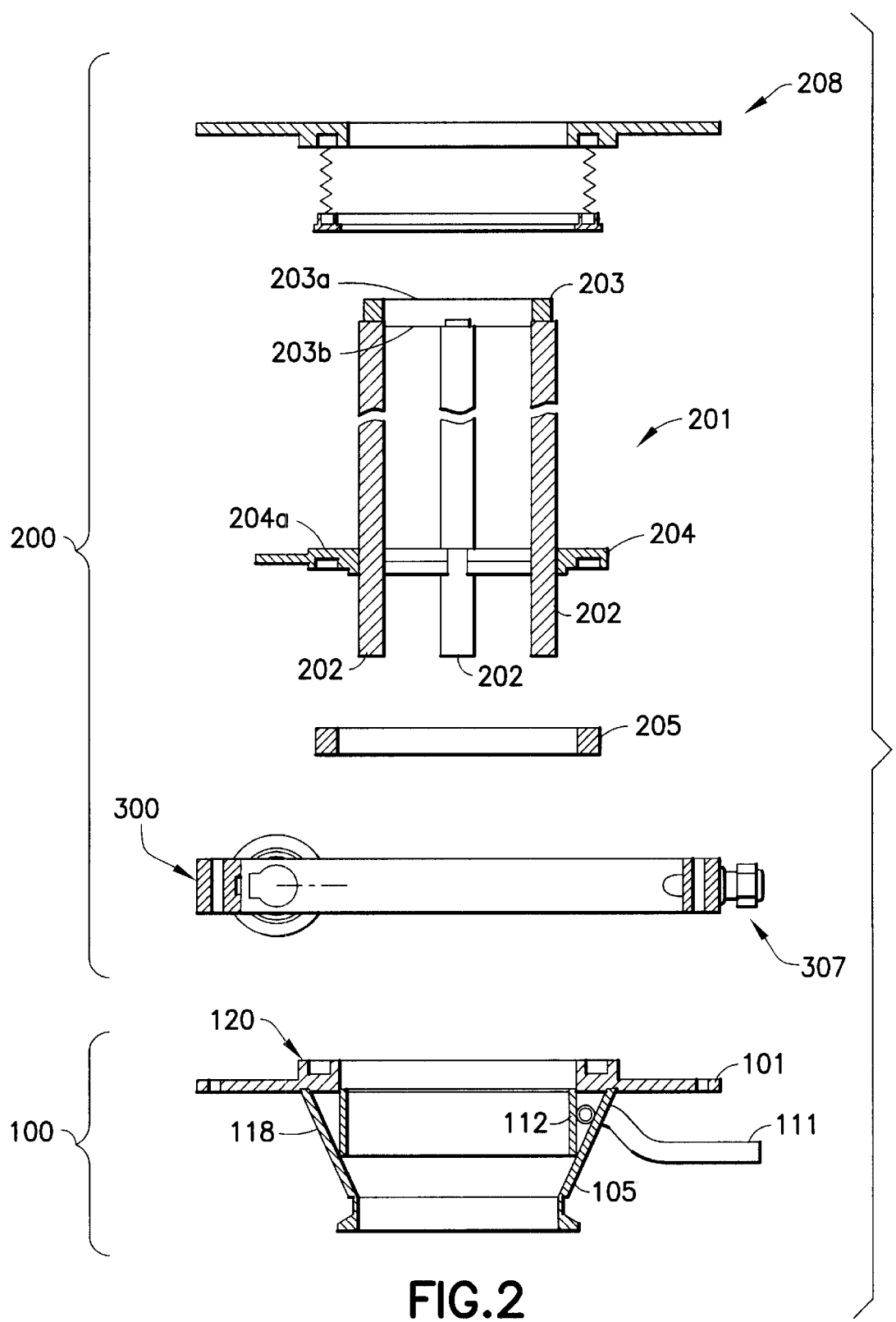
FIG. 2 is an exploded cross-sectional view of a preferred embodiment of the mechanical scraping means/liquid vortex of the abatement system of FIG. 1.
Figure 5:
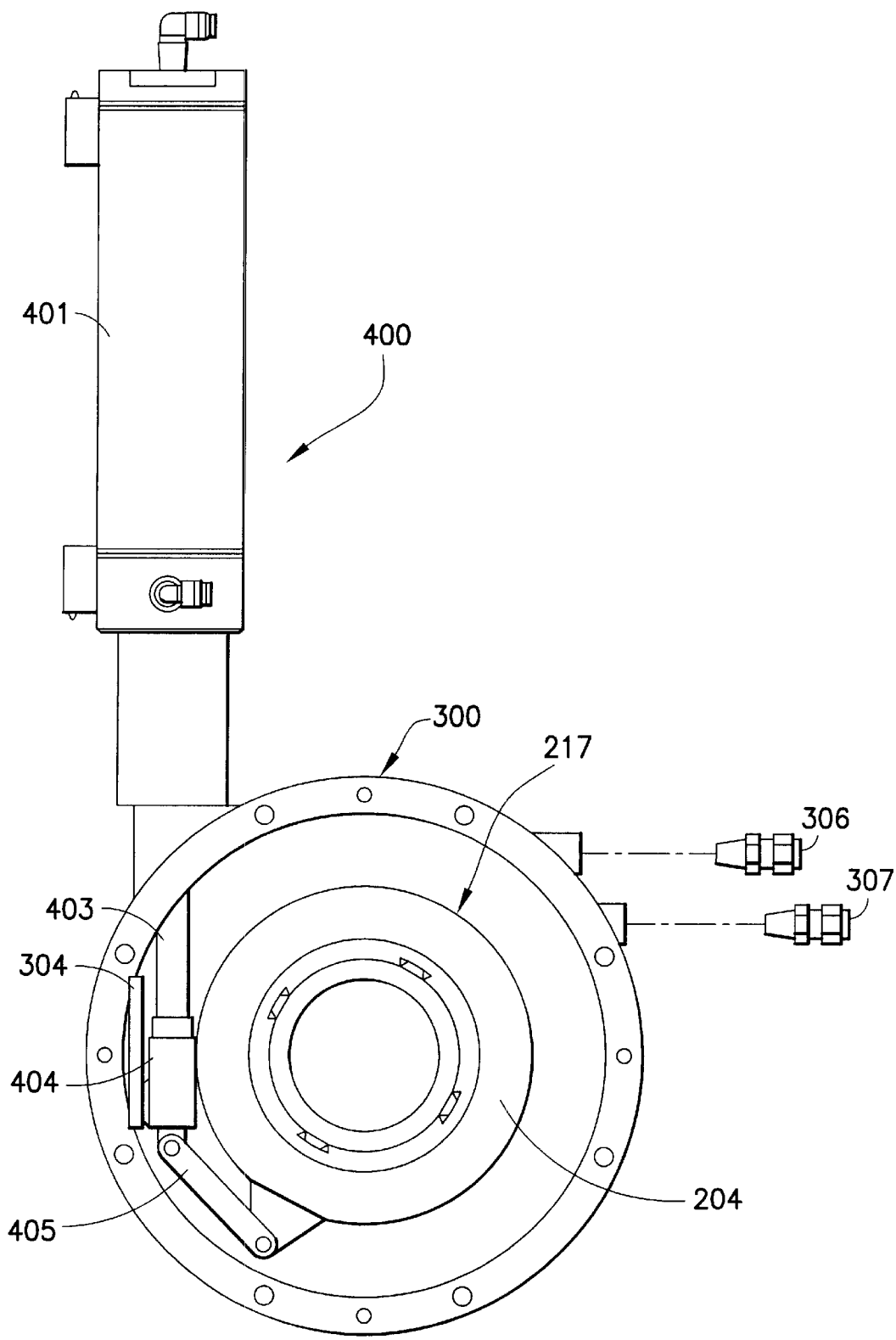
FIG. 5 is a top cross-sectional view of the drive assembly attached to the mechanical scraping device.
Figure 6:
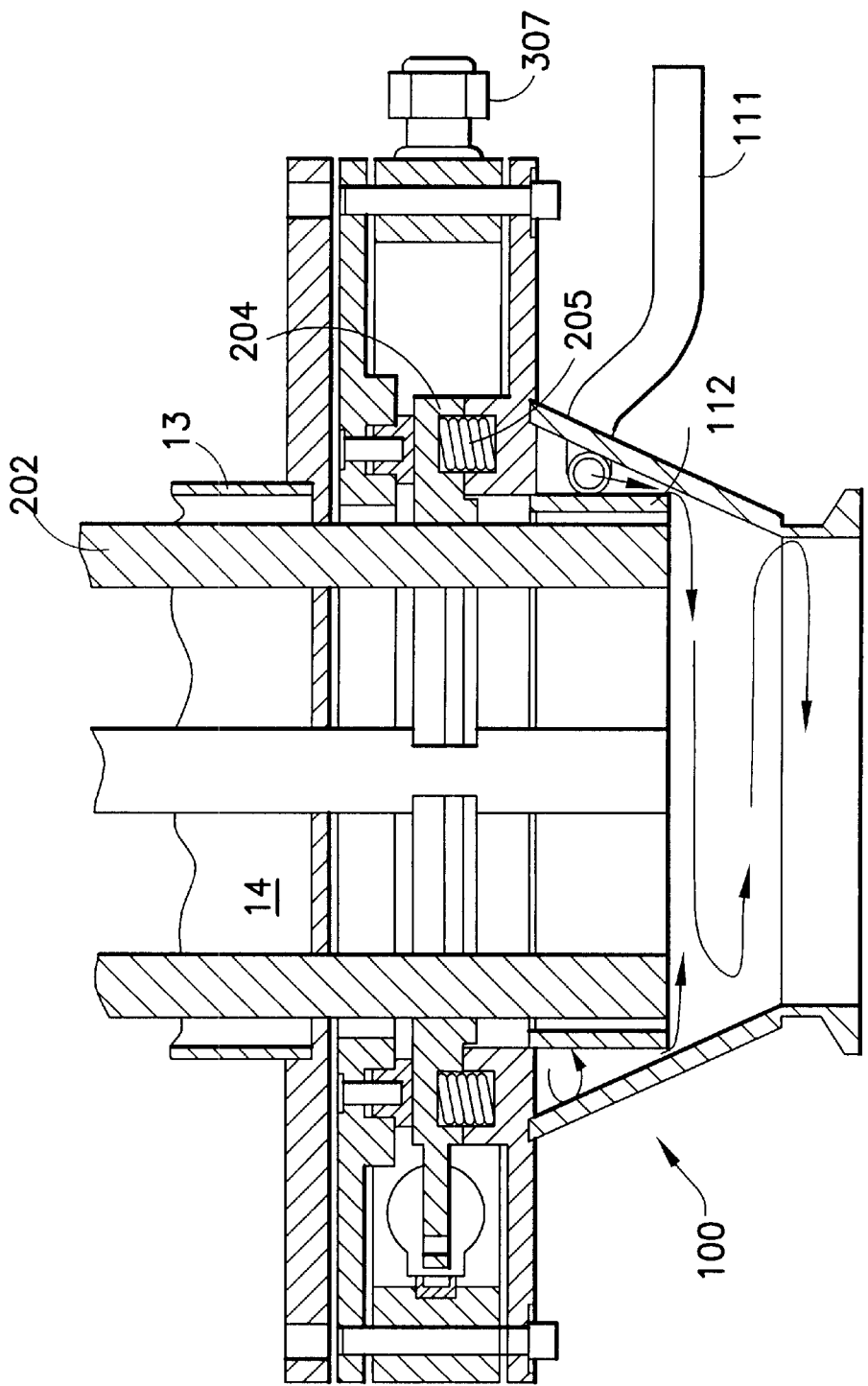
FIG. 6 is a cross-sectional view of FIG. 2.

FIG. 2 shows an exploded cross-sectional view of FIG. 6 that illustrates the mechanical scraping device 200 and liquid vortex 100 of the present invention. The mechanical scraping device 200 is preferably contained in housing 300 which has an inlet port 306 (shown in FIG. 5) and an outlet port 307 for the introduction of clean dry air (CDA) for exhaust moisture suppression. The introduction of CDA also assists in cooling the drive components and doubles as an air purge to prevent process gases from entering the drive mechanism of the mechanical scraping device.

The scraping device 200 comprises a blade assembly 201 that comprises one (1) or more, and most preferably four (4) blades 202 attached to at least an upper ring 203 and a lower ring 204. The blades 202 are preferably double-edged blades and clean in both the clockwise and counter clockwise directions. The blade width and rotation range are selected to provide overlap in the cleaning passes.

The blade assembly 201 is suitably arranged to pivot on a bushing 205, which is preferably attached to the water vortex unit 100 as illustrated in FIG. 6. The blade assembly 201 is preferably designed to press fit into the water vortex unit and suitably held in place by a spring loaded thrust bearing unit 208.

A drive mechanism 400 for rotating the blade assembly 201 is shown in FIG. 5 and comprises an air cylinder 401. The drive mechanism operates without the necessity of springs, gears, or push rod assembly. This advance over the presently existing cleaning mechanisms is enabled by directly linking the air actuator to the blade assembly. The air cylinder 401 comprises a piston rod 403 connected to a cylinder adapter 404. The cylinder adapter 404 is preferably attached to a rotating link 405. The other end of the rotating link is preferably attached to the lower ring 204 of the blade assembly 201. The air cylinder 401 is threaded into the housing 300.

FIG. 5 also shows a guide plate 304 that is attached to the housing 300. The guide plate may be attached to the housing by any means known in the art. The cylinder adapter 404 is preferably designed to slide along the guide plate 304 when the air cylinder 401 extends against a high load. When the air cylinder 401 retracts against a high load, the cylinder adapter 404 is designed to slide along the outside diameter 217 of the lower ring 204. The air cylinder piston rod 403 is thereby protected from excessive deflection or buckling, and the guide bushing (not shown) in the air cylinder 401 is protected from excessive wear. The guide plate 304 and bushing 205 are preferably designed to be removable rather than integral parts of other components so that they can be replaced with different materials if wear is excessive.

As stated hereinabove, the mechanical scraping device 200 and the liquid vortex 100 may be combined into an interconnected assembly.

As shown in FIG. 2, the water vortex unit 100 generally comprises a top plate 101, a generally cone-shaped outer shell 105 and a baffle 112. The outer shell 105 comprises a liquid inlet 111. The liquid inlet 111 is arranged in relation to the outer shell 105 such that as liquid is introduced tangentially into the outer shell 105 a laminar sheet of fluid (not shown) is formed on the inner surface of the outer shell 105. The liquid inlet 111 is in fluid connection with a fluid source (not shown) wherein the preferred fluid is water. The laminar sheet of water circles around and completely covers the inner surface of the outer shell 105.

The water vortex unit 100 also comprises a baffle 112 attached to the top plate 101 and extending generally vertically downwardly therefrom. The baffle 112 may be arrange to provide a flow through of liquid or in the alternative may be arranged to provide a flow restriction which ensures that concentric chamber 118 is substantially or completely filled with liquid. This arrangement prevents corrosive gases from entering the concentric chamber 118, prevents splashing, and aids in making the water flow laminar.

The water vortex unit 100 preferably comprises a flange 120 that accommodates the bushing 205 for the mechanical scraping device. Further, fluid flowing through the fluid vortex will cool the main bushing 205 about which the blade assembly 201 rotates.

The present invention preferably incorporates both a fluid vortex unit 100 and mechanical scraping device 200 in a single unit and used in conjunction with the lower spray jet 18 (shown in FIG. 1) outside of the combustion chamber, thereby preventing lower reaction chamber corrosion and build-up caused by minerals in the water.

In operation the present invention comprises an air flow that is delivered to the inlet of the compressor 4. The air flow may either be at ambient pressure or partially pressured conditions at a pressure ranging from about 50 to about 600 psig, and more preferably from about 60 to about 100 psig. Further the air is preferably compressed to a sufficiently high state for continuous and efficient operation of the oxygen separation unit 8.

The oxygen separation unit 8 comprises a module, such as a vessel containing ceramic-materials in an adsorbent bed or coated on a substrate, which may be constructed of any suitable material, such as a refractory metal. Alternatively, the vessel may be lined with an insulator material and heating elements may be incorporated on the inside of the vessel, to maintain the temperature of the bed at a suitable elevated temperature.

The present invention uses a ceramic oxide or polymeric material through which only oxygen can diffuse. The composition of the ceramic oxide or polymeric adsorbent material is such that a significant number of oxygen vacancies exist in the material. These oxygen vacancies facilitate the selective diffusion of oxygen through the material at relatively high rates. By placing either a voltage potential or a pressure gradient across the membrane, oxygen is selectively diffused in and through the oxide material.

For example, when placing a voltage potential across the membrane, a bed of ceramic-coated particles may be disposed in the containment vessel which contains a spaced-apart array of screen or grid electrode elements, containing ceramic adsorbent particles between the successive elements, and with the electrode elements alternatingly coupled to a voltage supply and ground, to provide a circuitry arrangement which can adsorb and then desorb the oxygen from an oxygen-containing gas.

The oxide compositions may be of any suitable type. These oxides preferably are characterized by 1) a high concentration of oxygen vacancies, 2) thermodynamic stability enabling operation at temperatures over 600° C., and 3) thermodynamic stability enabling operation under highly reducing conditions. Some oxides of such type are moisture-sensitive in character, but this is not problematic, since the adsorbent units may advantageously be run continuously at high temperature. Oxide compositions that exhibit vacancy ordering are less preferred due to their lower oxygen diffusivities. The following list sets forth some illustrative compositions that may advantageously be employed in the broad practice of the present invention:

$BaIn_{0.67}Zr_{0.33}O_y$
$BaIn_{0.67}Ce_{0.33}O_y$
$La_{0.5}Ba_{0.5} CO_{0.7} Cu_{0.3}O_y$
$La_{0.6}Sr_{0.4}Co_{0.8}Cu_{0.2}O_y$
$La_{0.8}Sr_{0.2}CoO_y$
$(Bi_2O_2)(NaNb_2O_{6.5})$
$Bi_2Sr_2Nb_2GaO_{11.5}$
$Bi_2Sr_2Nb_2AlO_{11.5}$
$ZrO_2-Y_2O_3-CeO_2$
$ZrO_2-Y_2O_3-Cr_2O_3$
$ZrO_2-Y_2O_3-MgO$
$Y_2O_3-CaO-CeO_2$
$ZrO_2-Y_2O_3$
$CeO_2-CaO-Y_2O_3$

Such materials may be readily synthesized within the skill of the art, using conventional ceramic synthesis procedures.

More specifically, the present invention in one aspect utilizes a ceramic ionic transport material as a pressure swing adsorbent (PSA) medium to trap and deliver oxygen. Rather than use electricity to drive the transport of oxygen, as in conventional ceramic membrane separation processes, the ionic transport ceramics alone can act as ionic oxygen storage media. The ceramic composition is deposited on a suitable substrate element, e.g., in a thin film, for such purpose.

The PSA system in the present invention operates on the principle that the ceramics used in the practice of the invention have the capacity to transport ionic oxygen. Molecular oxygen dissociates on the surface of the oxide ceramic and then is incorporated into the crystalline lattice. Potential gradients, for example in concentration, can cause the oxygen to move into and through the lattice. The imbalance in ions results in an electrical potential gradient across the material. In this manner, concentration and electrical gradients can be viewed as equivalent in terms of a driving force for oxygen transport. Thus, pressure (concentration) is used to drive ionic oxygen into the ceramic adsorbent articles.

In this manner, ionic transport materials are employed that are efficient "absorbents" with sole selectivity for oxygen. For example, by heating ceramic sorbent-coated particles and maintaining same at elevated temperature, oxygen will be removed from an air stream flowed through a bed of such particles. Then, by reducing the pressure, the oxygen-deficient air stream can be removed, and oxygen can subsequently be liberated from the ceramic to yield a pure oxygen source. By this absorbent arrangement, oxygen will be selectively and efficiently removed from the gas stream.

The present invention enables the bulk separation and purification of oxygen based on ionic transport, in which an adsorbent is maintained at high temperature to temporarily store oxygen, with oxygen that contacts the surface of the ceramic adsorbent decomposing on the surface and being incorporated into the crystalline lattice of the ceramic material. While such process requires high temperatures, e.g., on the order of 600–900° C., the higher separation efficiency of oxygen from other (inert) gases in the oxygen-containing feed gas mixture is unexpectedly superior to conventional PSA approaches.

When the oxygen gas contacts the ceramic adsorbent, there is adsorption and dissociation of the oxygen, with charge transfer acting to cause penetrative flux of the oxygen species into the sorbent material particle. The chemical potential driving force therefore is employed to effect ionic transport of the oxygen species into the sorbent material.

The ceramic oxide or polymeric adsorbent particles may be constituted by an inert substrate that is coated or otherwise associated with an oxygen-permeable thin dense electrolyte film. Such electrolyte film may be formed of fast ionic conductors, e.g., formed of fluorite lattice structure materials, or of fast mixed conductors such as those having a perovskite lattice structure. The resultant material provides mixed oxygen ion and electronic conduction with a homogeneous microstructure. High ambipolar conductivity may be achieved by doping with an impurity that functions as a stabilizer and creates electronic and ionic defects in the lattice. The impurity species may be a donor dopant, which substitutes a higher valence cation by a lower valence cation to yield oxygen ion vacancies. Alternatively, the impurity species may be an acceptor dopant, whereby a host lattice cation is replaced by a higher transition valence cation that improves the electronic properties of the material while concurrently creating oxygen ion vacancies at low partial pressures of oxygen.

Such electrolytes may include oxide fluorite oxygen ion conductors ($A_4O_8$ wherein A is Zr, Ce, Hf, Th, etc.) may be employed in which anion vacancies have been introduced by Aliovalent doping, using dopant species such as $M_2O_3$ cations, such as wherein M is $Ca^{++}$, $Sr^{++}$, $Mg^{++}$, $Ba^{++}$, $Sc^{+++}$, $Yb^{+++}$, $Y^{+++}$, $Sm^{+++}$, $La^{+++}$ and $Gd^{+++}$.

The electrolyte may alternatively be a pyrochlore ($A_2B_2O_7$) material, in which A is Ni, Gd, Nd, etc., and B is Zr, Ti, Ce, Nb, etc., and dopant species such as $Y^{+++}$, $Mg^{++}$ and $Ca^{++}$. Other potentially useful electrolyte species include $Bi_2O_3(A_2O_6)$ based electrolytes, including dopant stabilized forms of d-$Bi_2O_3$ such as $Bi_{2-x-y}M'_xM_yO_{3-d}$, where x=0 to 0.6, y=0.2–0.4 and d=±0.3, M'=Er, Y, Tm, Yb, Tb, Lu, Nd, Sm, Py, Zr, Hf, Th, Ta, Nb, Pb, Sn, In, Ca, Sr, Lr and M=Co, Ni, Cu, Mn, Fe. Oxygen ion conductors such as $Bi_{24}Pb_5Ca_3O_{44}$ and $Bi_{14}V_2O_{11}$ may also be potentially useful in the practice of the invention.

Various perovskite materials may also be usefully employed in the practice of the invention. Examples include compositions of the formula $ABO_3$ where A=La, Sr, Ca, etc. and dopants (donor) of Ba, Sr, and with B=Al, Mn, Ti, Zr, Fe, Co, Gd, etc. and dopants (acceptor) such as Fe, Mg, Cu, Co. Illustrative perovskites include $(Mg,Fe)SiO_3$, $CaSiO_3$, $LaNiO_3$, and $LaAlO_3$. Other electrolytes include oxide Brown Millerite ($A_2B_2O_5$) electrolytes such as those in which A=Sr, Ba, Ca and B=Fe, In, Gd, Fe with dopants (acceptor) of Ti, Zr; mixed Brown Millerite electrolytes including $ABO_3ABO_{2.5}$ electrolytes such as those of the formula $La_{1-y}A_yB_{1-x}C_xMO_{3+x}$ wherein x=0 to 1, y=0.2 to 0.8, A=Ba, Ca, Sr, and B=Cr, Fe, Mn, Co and C=Fe, Ni, Cu and M=B, Cr, Fe, Mn, Co, specific examples of which include $La_{0.5}Ba_{0.5}FeO_{3-x}$ and $La_{0.33}Sr_{0.67}FeO_{3-x}$ wherein x=±0.3; $A_4O_6ABO_{2.5}$ compositions including BiMeVO electrolytes such as $Bi_2V_{1-x}M_xO_{5.5-d}$ wherein x is from 0 to 0.8 and d=±0.3, Aurivillius electrolytes of the formula $(Bi_2O_2)(A_{m-1}B_mO_{3(m+1)})$ where m is from 0 to 1, A=Ca, Sr, Ba, Pb, K and B=Fe, Cr, Ti, Nb, Ta; mixed superconducting ($ABO_3AO$) electrolytes such as $K_2NiF_4$, $(La_{1-y}Sr_y)_2CuO_{4-x}$ and $BaY_2Cu_3O_{7-x}$ electrolytes wherein x is from 0 to 1 and y is from 0.2 to 0.8, cryolite ($A_3BO_3$) electrolytes such as $Sr_2Nb_2O_{11}$ and $Ba_2Ta_2O_{11}$ electrolytes; and columbite ($AB_2O_6$) electrolytes such as $Ni(Nb_{1-x}M_x)_2O_{6-x}$ wherein x is from 0 to 1 and y is from 0.2 to 0.8.

Illustrative perovskite-type compounds include $LaAlO_3$, $LaMnO_3$, $SrTiO_3$, $CaZrO_3$, $Sr_2Fe_2O_5$, $Ba_2In_2O_5$, $Sr_2Gd_2O_5$, $Ca_3Fe_2TiO_8$, $Ba_3In_2ZrO_8$, $YBa_2Cu_3O_7$, $La_{2-x}Sr_xCuO_4$, $BaCe_{0.9}Gd_{0.1}O_{2.95}$, $BaTh_{0.9}Gd_{0.1}O_{2.95}$, etc.

Particularly preferred ceramic adsorbent materials in the practice of the invention include $Bi_2O_3$, $La_{1-y}Ca_yCo_{1-x}Fe_xO_{3-d}$ wherein d=0.1 to 0.5, y=0.2 to 0.6, x=0 to 0.8 (referred to acronymically as "LCCFO"), and its nickel analog LCCNO, containing Ni instead of Fe.

The ceramic adsorbent coated article of the present invention may be of any suitable size, shape and conformation appropriate to the end use application and the specific feed gas mixture involved in the oxygen adsorption use of the material. For example, the article may be in a finely divided form, e.g., beads, spheres, rings, toroidal shapes, irregular shapes, rods, cylinders, flakes, foils, films, cubes, polygonal geometric shapes, sheets, fibers, coils, helices, meshes, sintered porous masses, granules, pellets, tablets, powders, particulates, extrudates, cloth or web form materials, honeycomb matrix monolith, composites (of the ceramic adsorbent with other components), or comminuted or crushed forms of the foregoing conformations.

Various ionic transport electrolyte materials are identified in Table 1 below wherein surface exchange rates, diffusion coefficients, and most importantly, maximum storage capacities are set forth. As shown in the table, $La_{0.4}Ca_{0.4}Co_{0.8}Fe_{0.2}O_{3-\delta}$, with the highest surface exchange rate, has a theoretical storage capacity of 150 mmol $O_2$/mol at 800° C.

TABLE 1

Experimental reported values for K and D, and some modeling results

| Composition | Temp. (° C.) | Surface Ex. Rate K (m/s) | Diffusion Coeff., D (m²/s) | Max. Storage (mmol $O_2$/mol) | Vacancy % Filled in 100s |
|---|---|---|---|---|---|
| $Zr_{0.84}Y_{0.16}O_{2-d}$ - YSZ | 700 | $6 \times 10^{-11}$ | $2.5 \times 10^{-13}$ | 40 | 0.13 |
| YSZ - Bi Implanted | 700 | $1.6 \times 10^{-10}$ | $1.4 \times 10^{-12}$ | 40 | 0.15 |
| YSZ - Fe Implanted | 700 | $3.4 \times 10^{-10}$ | $3.3 \times 10^{-13}$ | 40 | 0.66 |
| $Bi_{1.55}Er_{0.45}O_{3-d}$ | 700 | $1 \times 10^{-7}$ | $4 \times 10^{-9}$ | 250 | 1.76 |
| $Bi_{1.5}Y_{0.5}O_{3-d}$ | 700 | $5 \times 10^{-9}$ | $9 \times 10^{-12}$ | 250 | 1.85 |
| $La_{0.6}Sr_{0.4}Co_{0.8}Ni_{0.2}O_{3-d}$ | 800 | $2 \times 10^{-8}$ | $1 \times 10^{-11}$ | 150 | 6.75 |
| $La_{0.6}Sr_{0.4}Co_{0.6}Ni_{0.4}O_{3-d}$ | 800 | $3 \times 10^{-8}$ | $6 \times 10^{-12}$ | 200 | 12.4 |
| $La_{0.6}Sr_{0.4}Co_{0.4}Ni_{0.6}O_{3-d}$ | 800 | $2 \times 10^{-8}$ | $7 \times 10^{-12}$ | 250 | 7.97 |
| $La_{0.6}Ca_{0.4}Co_{0.8}Fe_{0.2}O_{3-d}$ | 700 | $4 \times 10^{-8}$ | $2 \times 10^{-12}$ | 150 | 25.27 |
| $La_{0.6}Ca_{0.4}Co_{0.8}Fe_{0.2}O_{3-d}$ | 800 | $2 \times 10^{-7}$ | $1 \times 10^{-11}$ | 150 | 44.6 |
| $La_{0.6}Ca_{0.4}Co_{0.8}Fe_{0.2}O_{3-d}$ | 900 | $4 \times 10^{-7}$ | $3 \times 10^{-11}$ | 150 | 48.5 |

Increasing the oxygen vacancy in LaCaCoFeO compounds, through compositional modifications, was unsuccessful in improving their oxygen absorption capacity. Replacement of the Fe element with Ni was found, surprisingly, to enable the manipulation of composition and storage capacity.

Synthesis of LaCaCoNiO perovskite oxide materials may be carried out by a modified "Pechini" method, a liquid mixed technique, with ethylene glycol and nitrates used for the synthesis of LaCaCoNi oxide powders. A typical Pechini process involves the ability of certain weak acids (alphahydroxycarboxylic acid) to form polybasic acid chelates with various cations. These chelates can undergo polyesterification when heated in a polyhydroxyl alcohol to form a polymeric glass which has the cations uniformly distributed throughout the material.

Various cationic sources, such as carbonates, hydroxides, and alkoxides can also be used for the synthesis. Ethylene glycol reactions are similar to those of primary alcohols except for the presence of a hydroxyl group on each carbon. When cold nitric acid is added to the ethylene glycol, it oxidizes one of the alcohol groups giving glycolic acid. Heating the mixture yields oxalic acid, which is the simplest dibasic acid, comprising just two connected functional acidic carboxylic groups. Each carboxylic group loses a proton and forms oxalate ion. The oxalate ion $C_2O_4^{-2}$ functions as a bidentate chelate with a metal atom and forms a five-member chelate ring as shown below.

The majority of the elements in the Periodic Table form oxalate complexes. Because of the coordinating properties of the bidentate oxalate ion, most of the metals form complex oxalates in addition to simple oxalates. After the formation of these mixed cation gels, they are suitably calcined at elevated temperature, e.g., at 1080° C., to form crystalline oxide.

The ceramic adsorbent materials of the invention may be formed by metalorganic chemical vapor deposition (MOCVD) on suitable supports or substrates, using appropriate precursors for the respective metal components of the metal oxide ceramic materials. Usage of MOCVD is preferred as a result of the control of stoichiometry and uniformity of coverage that are thereby achievable. MOCVD permits films of multicomponent ceramics to be deposited with compositional reproducibility on the order of 0.1% and thickness uniformity of better than 5%.

Alternatively, the ceramic adsorbent material may be formed on the substrate element by conventional ceramic manufacturing techniques, such as powder metallurgy, slurry metallurgy (slip casting, tape casting, etc.) and coextrusion.

Another technique for forming the ceramic adsorbent article utilizes sol gel techniques, in which the ceramic material is deposited on a carrier or inert substrate, such as a porous silica, alumina, clays, glasses, or the like. Sol gel techniques may be employed to make up a sol of the ceramic precursor and to spray, dip-coat, soak, roller coat, or otherwise apply the solution to the substrate, following which the mixed cation gel can be subjected to high temperature, e.g., calcined, to produce the desired ceramic material.

In the use of MOCVD, the ceramic coating process may employ either neat liquids or liquid solutions (if solid precursors are used) in a single mixture containing all the components desired in the film. Such "liquid delivery" is an advantageous method of forming the ceramic adsorbent elements.

In forming films of the ceramic adsorbent material on substrate elements in the practice of the invention, individual precursors required for phase stability can be intimately mixed in a ratio that produces the desired film composition based on their respective deposition rates. Using liquid delivery the liquid sources are flash vaporized, thereby spending little time at the high temperature that leads to decomposition.

Precursor compositions are commercially available for the metal species of the ceramic adsorbent compositions of the invention, e.g., Zr, Y, Sr, Bi, Fe, La, Co, Ca precursors, which are provided in liquid form as precursors suitable for liquid delivery MOCVD. Liquid delivery precursors of such type are commercially available from Advanced Technology Materials, Inc. (Danbury, Conn.) under the trademark EPI-GRADE. Examples of such types of precursors include those disclosed in U.S. Pat. Nos. 5,453,494, 5,840,897, 5,820,664, and 6,110,529, the disclosures of which hereby are incorporated herein in their respective entireties.

Using the ceramic materials of the invention as absorbents in fixed bed PSA systems offers several advantages that currently hamper the development of such materials as membranes:

Reliability—Hot spots can develop in ceramic membranes as a result of exothermic recombination reactions on the surface of a nonuniform membrane. The hot spots then exhibit higher oxygen diffusion rates leading to runaway reactions and film failures. This problem can exist in newly manufactured membranes, and can develop in membranes exposed to many hours of use. By utilizing the ceramic adsorbent material in a PSA arrangement, pin-holes, film uniformity, thermal expansion mismatches, and sealing problems no longer are relevant.

Easy Scale-Up and Development—The active ceramic material in the present invention is not employed as a structural operational element where its physical integrity is important for function. Structural applications for ceramics are notorious for scale-up problems. With a fixed bed, scale-up is straightforward and economical. The components of the PSA equipment are well known and their reliability is proven.

Large Surfaces Areas—By properly choosing the particle size and porosity, the surface area of the ceramic adsorbent in the bed of ceramic-coated articles can be adjusted to maximize mass transport for specified pressure swings and diffusion distances.

High purity inert and oxygen streams—Because the ceramic adsorbent material has perfect selectivity for oxygen, both high purity oxygen and inert streams can be produced. Conventional air separation PSA utilizes the differences in quadrapole moments between nitrogen and oxygen for separation, and since argon does not have a quadrapole moment it is not separated from oxygen. As a ceramic sorbent will only absorb oxygen, the inert components such as nitrogen and argon are left behind in the gas processed by contacting with the ceramic sorbent, and do not contaminate the product gas.

Rather than use an electric potential to drive ceramic material membranes, ceramic adsorbent articles of the present invention can utilize a concentration gradient to store oxygen. By having a pressure or concentration gradient over the ceramic coating, a concentration profile is developed within the film. In the presence of air at high temperature, oxygen will diffuse into the structure. Then by reducing the pressure or by using a vacuum, oxygen will diffuse from surface coating, thus providing a supply of pure oxygen.

A PSA process in the practice of the present invention may be carried out at any suitable pressure levels in the respective adsorption ("loading" of the ceramic adsorbent) and desorption (releasing of oxygen from the ceramic adsorbent), as may be readily be determined within the skill of the art and without undue experimentation. The adsorption pressure may by way of illustration entail a pressure level on the order of from about 1.2 to about 10 atmospheres, and the corresponding desorption pressure may be in the range of from about −0.2 atmosphere to about 0.8 atmosphere, at a temperature that is appropriate to the process, feed gas mixture and oxygen product characteristics.

The temperature maintained in the PSA process in one preferred aspect of the invention may be on the order of from about 500° C. to about 900° C. The adsorbent beds may be maintained in a heated condition by any suitable heating or thermal energy input means, such as for example electrical resistance heating elements disposed in the adsorbent bed, jacketing of the adsorbent vessels of the PSA system with a suitable heat exchange fluid being flowed through the jacket to maintain the vessel and adsorbent bed contained therein at a selected temperature. Other means include elements, assemblies and subassemblies for effecting radiant heating, ultrasonic heating, microwave heating, convective heating, conductive heating (e.g., via extended surface elements such as fins in the interior volume of the adsorbent bed, coupled in heated relationship with a thermal energy source), heat exchangers, etc.

The adsorbent beds in the PSA process system may be suitably sized for any appropriate output of oxygen for the given oxygen-containing feed gas mixture that is processed in the oxygen separation device, and the appertaining cycle time. For example, the system may be sized to produce 120 standard cubic feet per minute (SCFM) of oxygen at 99.95% purity from an oxygen-nitrogen mixture, during a 2 minute PSA cycle.

The PSA system of the invention may be advantageously employed to produce product gases such as oxygen, deoxygenated gases or gas mixtures (where the feed gas mixture undesirably contains oxygen), nitrogen (as the non-adsorbed gas from an oxygen-nitrogen mixture), etc. In one aspect, the PSA system of the invention may be employed to form "deoxo" gas, in which a 98% nitrogen stream containing oxygen is treated by the PSA process of the invention to yield a nitrogen gas product containing less than 100 parts per million by volume of oxygen.

The ceramic adsorbent material may be coated in a thin film by MOCVD on an inert substrate, e.g., a particulate substrate, fibrous substrate, sheet or other substrate formed of a material such as active alumina, gamma alumina, tabular alumina or fused alumina. Alternatively, the coating of the substrate may be carried out by spray, sol gel, soak-and-bake, solution deposition, dipping, roller coating, or any other suitable technique. Such coated substrate bodies can be employed for pressure swing separation of oxygen-containing feed gas mixtures when such bodies are aggregated in a bed or mass with which the feed gas mixture is contacted at higher pressure, for subsequent release of the oxygen gas at lower pressure.

Figure 3:
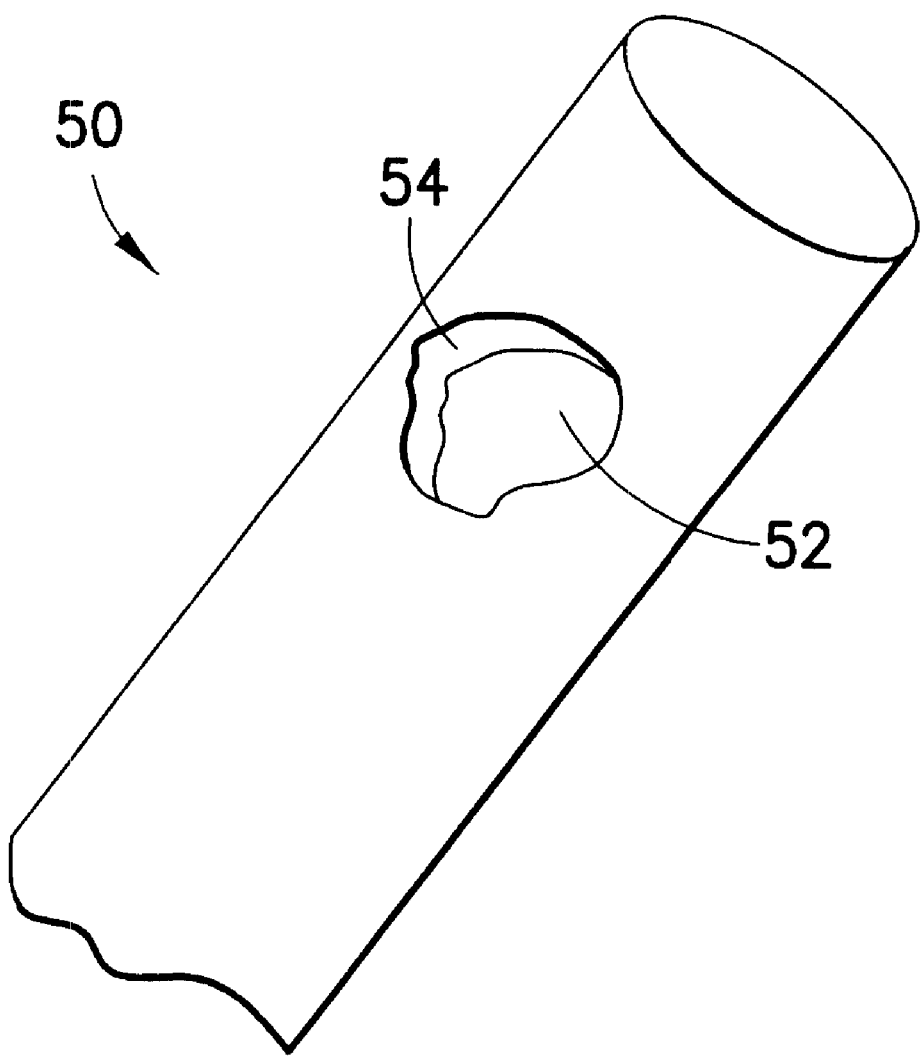
FIG. 3 is a perspective view of a coated fiber article including a fiber substrate coated with a ceramic adsorbent material according to one embodiment of the invention.

FIG. 3 is a perspective view of a coated fiber article 50 including a fiber substrate 52 coated with a ceramic adsorbent material 54 according to one embodiment of the invention. Coated fibers of such type may be employed in a bed of such fibers in a PSA process for extraction of oxygen from an oxygen-containing feed gas mixture. Alternatively, such fibers may be formed into woven or non-woven fibrous webs, which may likewise be employed in a PSA process for take-up of oxygen from an oxygen-containing feed gas mixture.

The fiber substrate 52 may be formed of a porous alumina material. The coating 54 may be a LCCFO material deposited on the fiber substrate at a thickness on the order of 0.1 micrometer. Such coated fiber article may be readily formed by liquid delivery MOCVD techniques using suitable precursors for the lanthanum, calcium, cobalt, and iron components of the LCCFO film.

Alternatively, the coated fiber article may be formed by sol gel techniques, or in any other suitable manner.

The PSA system using ceramic adsorbent articles of the invention embodies a highly efficient means and method for the extraction of oxygen from an oxygen-containing feed gas mixture, by contacting such feed gas mixture with the ceramic sorbent coating material having sorptive affinity for oxygen at elevated temperatures, such as in the range of 500° C.–1000° C. The PSA system may be controlled by suitable cycle timer units, e.g., integrated with computer control, to provide appropriate continuous, semi-continuous or batch operation.

Figure 4:
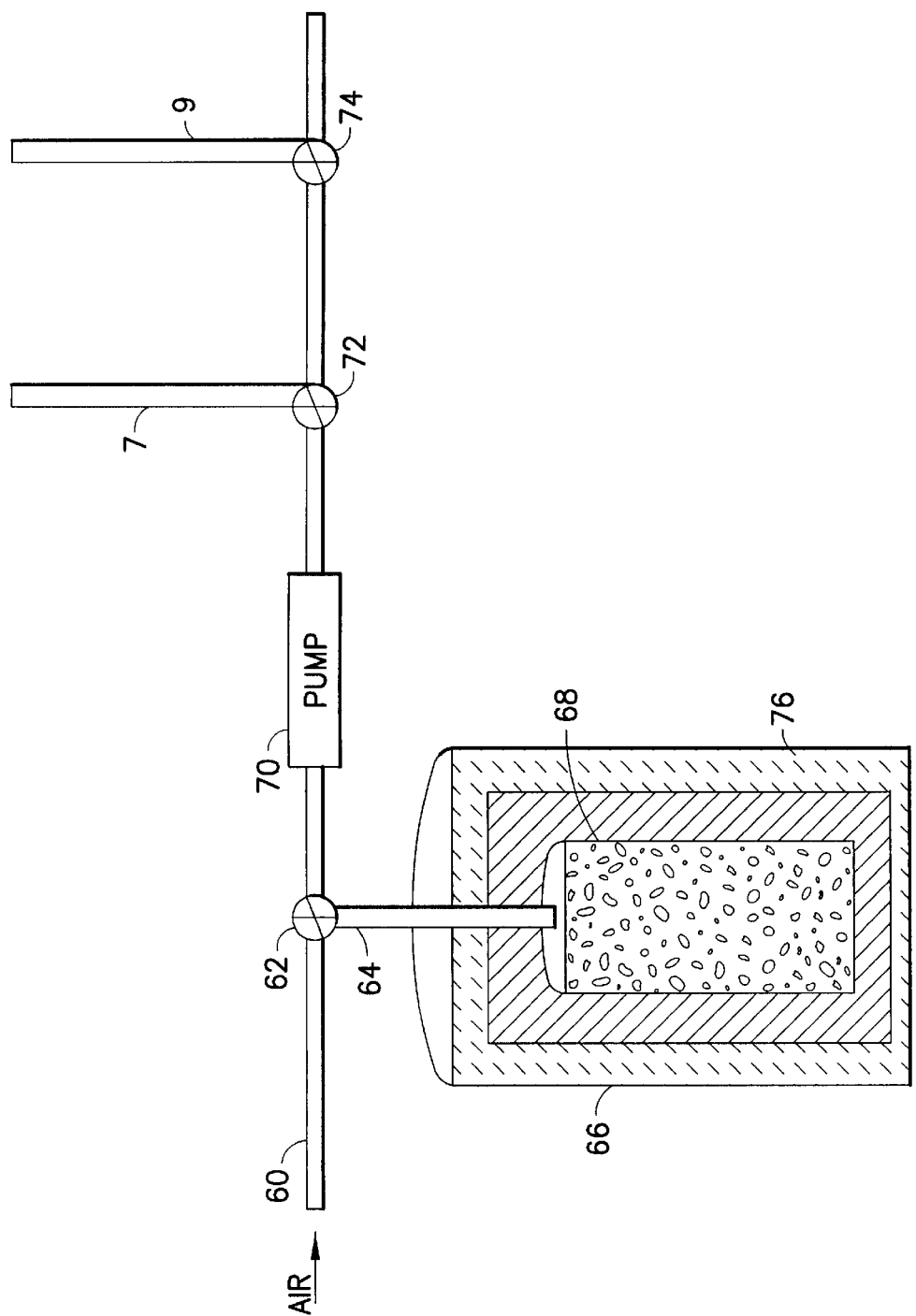
FIG. 4 is a schematic representation of pressure swing adsorption system using a ceramic adsorbent and utilized as an oxygen separation device, according to one embodiment of the present invention.

FIG. 4 shows a PSA module used as the oxygen separation device 8 in operation according to the present invention. Air or other oxygen-containing feed gas mixture from a compressor source 4 (shown in FIG. 1) is flowed through the main flow conduit 60 with the valve 62 directing the flow through feed and dispensing conduit 64 into vessel 66. During such charging the furnace 76 is actuated and maintains the ceramic adsorbent in a "hot" state appropriate to penetration of the oxygen into the sorbent articles of bed 68. When the bed has equilibrated, the interstitial void gas in the bed 68, comprising at least nitrogen, and essentially depleted in oxygen, is then pumped by pump 70 to line 9 as shown in FIG. 1, with valve 62 being switched to interconnect dispensing conduit 64 with the downstream portion of main flow conduit 60, valve 72 being closed to flow into the branch line 7, and valve 74 being open to flow of gas from the main flow conduit 60 into branch line 9.

The furnace 76 remains actuated, as valve 74 is closed to isolate the branch line 9, and valve 72 is opened to permit flow from the main flow conduit 60 to branch line 7. Pump 70 then acts to extract the oxygen gas from the vessel 66, as the ceramic adsorbent is maintained at a temperature allowing transport of the "trapped" oxygen from the sorbent bed articles into the voids of the bed. The oxygen gas may then be flowed from module 8 through conduit 7, into inlet 15 as shown in FIG. 1.

After the adsorbent bed in module 8 has been extracted of the oxygen, the feed gas mixture is again charged to the sorbent bed in the module as the furnace is maintained in operation to keep the adsorbent at suitable elevated temperature. Concurrently, a flow of non-adsorbed nitrogen gas may be directed through conduit 9 to port 28 thereinto, as the cycle is repeated.

In this manner, the system schematically shown in FIGS. 1 and 4 may be sequentially, repetitively and cyclically operated to effect separation of air or other oxygen-containing feed gas mixture into oxygen-depleted and oxygen fractions for recovery thereof as described.

The blade assembly 201 may be operated during the combustion process to essentially prevent deposit formation on the interior walls 13 of the combustion chamber 14 or after the combustion process. Operation during the combustion process increases efficiency and economical usage of water introduced into the vortex unit 100. During the combustion process the blade assembly 201 may rotate clockwise and counter clockwise with the extension and retraction of the piston 403 of air cylinder 401 and removed deposits are washed through vortex unit 100.

It will be apparent that the system shown schematically in FIG. 1 is illustrative only, and that the invention may be practiced in other, multiple-bed arrangements, for continuous, semi-continuous, or batch operation, to separate the feed gas mixture involved. The heat flux may be maintained constant throughout the entire operation of the PSA process, or the temperature may be modulated during the process, as may be necessary or desirable in a given end use application of the present invention. For this purpose, the process system may employ suitable thermostatic, heat exchange or other temperature-controlling elements, such as thermo sensors, temperature controllers, microprocessors, mass flow controllers, etc.

The features and advantages of the invention are more fully shown with reference to the following non-limiting example, wherein all parts and percentages are by weight, unless otherwise expressly stated.

EXAMPLE I

A PSA system including an adsorbent bed containing LCCFO ceramic material is used as a separation device to produce oxygen at high purity for introduction into a thermal/wet abatement system.

Influent air stream has a mole fraction composition of oxygen, 20.9 mol. %, nitrogen, 78 mol. %, argon, 1.0 mol. % and carbon dioxide, 0.10 mol. %. This stream is at a temperature of 25° C. and a pressure of 50 psia. The temperature of the adsorbent bed is at 800° C.(alternatively, a value in the range of from about 600° C. to about 900° C. may be usefully employed). The feed air stream is heated in the heat exchanger upstream of the adsorbent bed to a temperature of 483° C. and is at a pressure of 100 psia. The compressor upstream from the heat exchanger provides heat for warming the feed stream and the adsorbent membrane means.

The influent air is passed to the adsorbent bed and oxygen is removed therefrom by the adsorbent in the bed, with the bed being heated by suitable means. In the depressurized state after active removal of oxygen from the air contacted with the adsorbent, the oxygen is pumped from the bed by a pump arranged downstream from the adsorbent bed and discharged from the system for introduction into the thermal reactor shown in FIG. 1.

The nitrogen-rich gas yielded by the adsorption of oxygen from the feed air mixture and discharged from the adsorbent bed is at a temperature of 800° C. and a pressure of 130 psia. After passage of the nitrogen-rich gas through the counter-current heat exchanger, the nitrogen-rich gas is discharged from the process system at a pressure of 50 psia and a temperature of 200° C.

The product nitrogen-rich gas contains 98.35 mol. % nitrogen, 0.27 mol. % oxygen, 1.26 mol. % argon, and 0.13 mol. % carbon dioxide. The nitrogen-rich gas is discharge through line 9 and may be employed for reducing the dew point of emitting gases by introduction into port 28.

The oxygen-rich gas released from the adsorbent bed during the low-pressure step of the PSA process is at a pressure of 0.5 psia and a temperature of 800° C. The final oxygen-rich gas discharged from the downstream pump is at a pressure of 1 psia. The oxygen-rich gas contains 96.32 mol. % oxygen, 3.63 mol. % nitrogen, 0.05 mol% argon, and no carbon dioxide. The oxygen rich gas is pumped through line 7 to the thermal reactor.

EXAMPLE II

A ceramic adsorbent sol gel was employed to coat an alumina fiber mat using soak-and-bake or spray techniques. Usage of the solid fiber mat substrates offers several advantages, including reduction of pressure drop and maximum usage of the ceramic adsorbent medium. By coating the ceramic adsorbent medium on porous alumina substrates, an oxygen diffusion distance of 80 micrometers was achieved at 800° C.

What is claimed is:

1. An abatement system for pollutants in a gas stream, comprising:
   a combustion chamber comprising an inlet for introducing the gas stream, a hot zone for combusting the pollutants in the gas stream, a chamber cleaning means to remove combustion deposition products and an oxygen-enriched gas inlet communicatively connected to a source of compressed air, wherein the oxygen-enriched gas inlet is positioned downstream from the hot zone for introduction of an oxygen-enriched gas into the central area of the combustion chamber; and
   an oxygen separation unit positioned between the gas inlet and the source of compressed air to provide a source of the oxygen-enriched gas to the combustion chamber.

2. The system according to claim 1 wherein the oxygen separation unit comprises a membrane device constructed and arranged to separate $O_2$ from $N_2$ in the compressed air, for introduction of separated $O_2$ into the combustion chamber.

3. The system according to claim 1 wherein the oxygen separation unit comprises an oxygen-adsorbent ceramic material or polymeric material having affinity for oxygen when the ceramic material or polymeric material is at elevated temperatures.

4. The system according to claim 3, wherein the ceramic material is selected from the group consisting of:

$Bi_{2-y}Er_yO_{3-d}$;
$Bi_{2-y}Y_yO_{3-d}$;
$La_{1-y}Ba_yCo_{1-x}Ni_xO_{3-d}$;
$La_{1-y}Sr_yCo_{1-x}Ni_xO_{3-d}$;
$La_{1-y}Ca_yCo_{1-x}Ni_xO_{3-d}$;
$La_{1-y}Ba_yCo_{1-x}Fe_xO_{3-d}$;
$La_{1-y}Sr_yCo_{1-x}Fe_xO_{3-d}$; and
$La_{1-y}Ca_yCo_{1-x}Fe_xO_{3-d}$;
wherein
x is from 0.2 to 0.8,
y is from 0 to 1.0 and
d=0.1 to 0.9.

5. The system according to claim 3, wherein the ceramic material is selected from the group consisting of:

oxide fluorite oxygen ion conductors of the formula $A_4O_8$;
pyrochlore material of the formula $A_2B_2O_7$;
material of the formula $Bi_2O_3(A_2O_6)$;
stabilized forms of $d-Bi_2O_3$;
$Bi_{24}Pb_5Ca_3O_{44}$;
$Bi_{14}V_2O_{11}$;
perovskite materials of the formula $ABO_3$;
oxide Brown Millerite electrolytes of the formula $A_2B_2O_5$;
mixed Brown Millerite electrolytes of the formula $ABO_3ABO_{2.5}$;
$A_4O_6ABO_{2.5}$ compositions;
mixed superconducting ($ABO_3AO$) electrolytes;
cryolite ($A_3BO_3$) electrolytes;
columbite ($AB_2O_6$) electrolytes;
and corresponding doped materials, wherein A and B are metals independently selected from the group consisting of lanthanum, aluminum, strontium, titanium, calcium, zirconium, iron, barium, indium, gadolinium, yttrium, copper, cerium, thorium, bismuth, cobalt, nickel, magnesium, manganese, vanadium, chromium, niobium, tantalum, boron, haffiium, neodymium, terbium, ytterbium, erbium, thallium, lutetium, samarium, lead, tin, lawrencium, and praseodymium.

6. The system according to claim 1 wherein the chamber cleaning means comprises:

(i) at least one annular mounting member;
(ii) at least three scraping blades attached peripherally about the annular mounting member and arranged in a parallel relationship to a longitudinal axis of the chamber; and
(iii) a reciprocal movement unit for rotating the scraping blade(s) circumferentially back and forth along the interior surface of the combustion chamber to scrape the interior surface of the combustion chamber, wherein such reciprocable movement unit comprises a reciprocable member pivotally connected to an extension member, and the extension member is pivotally connected at a peripheral position to the blade apparatus.

7. The system according to claim 6 wherein the abatement system further comprises heating elements annularly positioned about the inner wall of the combustion chamber, a liquid vortex which cools gases passing from the combustion chamber and communicatively connected to the chamber cleaning means; a packed bed for trapping and condensing particles from the gas stream after passing through the liquid vortex unit; and a liquid scrubber for removing chemical pollutants.

8. The system according to claim 1 wherein the pollutants are introduced from a semiconductor manufacturing apparatus.

9. The system according to claim 6 wherein the rotating blades are double-edged and the reciprocable member is a piston of an air cylinder.

10. A thermal reactor system for oxidative treatment of gaseous pollutants in a gas stream, the system comprising:

a combustion chamber having an entry end comprising at least one gas stream inlet for introducing combustible gaseous products and an exit end for removal of combustion products from the combustion chamber;

a hot zone within the combustion chamber located adjacent to the entry end wherein gases entering the combustion chamber react and mix;

an orifice in the combustion chamber communicatively connected to a source of compressed air to introduce oxygen enriched air into the central area of the combustion chamber, the orifice located downstream of the hot zone and downstream from the gas stream inlet for introducing combustible gaseous pollutants; and an oxygen separation unit positioned between the orifice and the source of compressed air to introduced oxygen enriched air to the hot zone of the combustion chamber to increase complete combustion and reduce formation of carbon monoxide.

11. The system according to claim 10 wherein the source, of compressed dry air is a compressor and the oxygen separation unit comprises a membrane means for continuously separating pressurized air into oxygen-enriched and oxygen-depleted streams; and the system further comprises a heat exchanger positioned between the compressor, and the membrane means for transferring heat from the compressor to the membrane means.

12. The system according to claim 10, wherein the oxygen separation device comprises an oxygen-adsorbent ceramic material having affinity for oxygen when the ceramic material is at elevated temperatures, wherein the absorbent ceramic material is selected from the group consisting of:

$BaIn_{0.67}Zr_{0.33}O_y$
$BaIn_{0.67}Ce_{0.33}O_y$
$La_{0.5}Ba_{0.5}CO_{0.7}Cu_{0.3}O_y$
$La_{0.6}Sr_{0.4}Co_{0.8}Cu_{0.2}O_y$
$La_{0.8}Sr_{0.2}CoO_y$
$(Bi_2O_2)(NaNb_2O_{6.5})$
$Bi_2Sr_2Nb_2GaO_{11.5}$
$Bi_2Sr_2Nb_2AlO_{11.5}$
$ZrO_2-Y_2O_3-CeO_2$
$ZrO_2-Y_2O_3-Cr_2O_3$
$ZrO_2-Y_2O_3-MgO$
$Y_2O_3-CaO-CeO_2$
$ZrO_2-Y_2O_3$; and
$CeO_2-CaO-Y_2O_3$.

13. The system according to claim 12 wherein the ceramic material or polymeric material is present in a packed adsorbent bed.

14. The system according to claim 13 wherein the oxygen separation unit comprises a vessel lined with an insulator material, and heating elements incorporated in the vessel to maintain the bed at elevated temperature.

15. The system according to claim 14 wherein said elevated temperature comprises temperatures in a range of from about 600 to 900° C.

16. The system according to claim 12 wherein the ceramic material is deposited on an inert substrate as an oxygen-permeable thin film electrolyte thereon.

17. The system according to claim 10 further comprising a mechanical scraping device positioned within the combustion chamber for cleaning interior surfaces therein, the device comprising:
   (i) at least one annular mounting member;
   (ii) at least three scraping blades attached peripherally about the annular mounting member and arranged in a parallel relationship to a longitudinal axis of the chamber; and
   (iii) a reciprocal movement unit for rotating the scraping blade(s) circumferentially back and forth along the interior surface of the chamber to clean the interior surface of the chamber, wherein such reciprocable movement unit comprises a reciprocable member pivotally connected to an extension member, and the extension member is pivotally connected at a peripheral position to the blade apparatus.

18. A method for retrofitting an abatement system for processing a gaseous waste stream to introduce an oxygen-enriched gas therein and remove surface deposits within an abatement chamber having a hot zone and an inlet orifice for introducing the oxygen-enriched gas therein, wherein the inlet orifice is positioned downstream from the hot zone, the method comprising:
   providing an oxygen-enriching device communicatively connected to the abatement chamber;
   introducing compressed dry air to the oxygen-enriching device wherein the compressed dry air is separated into an oxygen-rich gaseous component and a nitrogen-rich gaseous component;
   introducing the oxygen-rich gaseous component into the hotzone of the abatement chamber through a centrally positioned orifice which is positioned downstream from the hotzone; and
   providing a mechanical scraping device in the abatement chamber.

19. The method according to claim 18, wherein the oxygen separation unit generates an oxygen-enriched gas having at least 95% oxygen purity.

20. The method according to claim 18 wherein the oxygen separation unit comprises an oxygen-adsorbent ceramic material or polymeric material having affinity for oxygen when the ceramic material or polymeric material is at elevated temperature.

21. The method according to claim 20, wherein the ceramic material is selected from the group consisting of:
   $Bi_{2-y}Er_yO_{3-d}$;
   $Bi_{2-y}Y_yO_{3-d}$;
   $La_{1-y}Ba_yCo_{1-x}Ni^xO_{3-d}$;
   $La_{1-y}Sr_yCo_{1-x}Ni_xO_{3-d}$;
   $La_{1-y}Ca_yCo_{1-x}Ni_xO_{3-d}$;
   $La_{1-y}Ba_yCo_{1-x}Fe_xO_{3-d}$;
   $La_{1-y}Sr_yCo_{1-x}Fe_xO_{3-d}$; and
   $La_{1-y}Ca_yCo_{1-x}Fe_xO_{3-d}$;

wherein
   x is from 0.2 to 0.8,
   y is from 0 to 1.0 and
   d=0.1 to 0.9.

22. The method according to claim 20, wherein the ceramic material is selected from the group consisting of:
   oxide fluorite oxygen ion conductors of the formula $A_4O_8$;
   pyrochlore material of the formula $A_2B_2O_7$;
   material of the formula $Bi_2O_3(A_2O_6)$;
   stabilized forms of $d\text{-}Bi_2O_3$;
   $Bi_{24}Pb_5Ca_3O_{44}$;
   $Bi_{14}V_2O_{11}$;
   perovskite materials of the formula $ABO_3$;
   oxide Brown Millerite electrolytes of the formula $A_2B_2O_5$;
   mixed Brown Millerite electrolytes of the formula $ABO_3ABO_{2.5}$;
   $A_4O_6ABO_{2.5}$ compositions;
   mixed superconducting ($ABO_3AO$) electrolytes;
   cryolite ($A_3BO_3$) electrolytes;
   columbite ($AB_2O_6$) electrolytes;
   and corresponding doped materials, wherein A and B are metals independently selected from the group consisting of lanthanum, aluminum, strontium, titanium, calcium, zirconium, iron, barium, indium, gadolinium, yttrium, copper, cerium, thorium, bismuth, cobalt, nickel, magnesium, manganese, vanadium, chromium, niobium, tantalum, boron, haffiium, neodymium, terbium, ytterbium, erbium, thallium, lutetium, samarium, lead, tin, lawrencium, and praseodymium.

23. The method according to claim 20 wherein the ceramic material or polymeric material is present in a packed adsorbent bed.

24. The method according to claim 23 wherein the oxygen separation device comprises a vessel lined with an insulator material, and heating elements are incorporated inside of the vessel to maintain temperature of the bed at elevated temperature.

25. The method according to claim 24 wherein said elevated temperature comprises temperature in a range of from about 600 to 900° C.

26. The method according to claim 18 wherein the mechanical scraping device is positioned within the abatement chamber for cleaning interior surfaces therein, the device comprising:
   (i) at least one annular mounting member;
   (ii) at least three scraping blades attached peripherally about the annular mounting member and arranged in a parallel relationship to a longitudinal axis of the chamber; and
   (iii) a reciprocal movement unit for rotating the scraping blade(s) circumferentially back and forth along the interior surface of the abatement chamber to clean the interior surface of the abatement chamber, wherein such reciprocable movement unit comprises a reciprocable member pivotally connected to an extension member, and the extension member is pivotally connected at a peripheral position to the blade apparatus.

27. The method according to claim 26 further comprising:

(i) a vortex unit attached in fluid communication with the chamber, the vortex unit comprising a generally conical outer shell having a top plate, an inner surface and a central opening which is generally aligned with the interior surface of the chamber; a baffle attached to the top plate and extending generally vertically downwardly therefrom, the baffle generally concentrically aligned with the inner surface of the outer shell to form a concentric chamber; and (ii) a liquid inlet arranged to tangentially introduce liquid into the concentric chamber, thereby filling the concentric chamber with liquid and forming a laminar sheet of fluid on the inner surface of the outer shell.

* * * * *